Feb. 14, 1939.   K. L. SCOTT   2,146,857
TESTING APPARATUS
Filed Sept. 19, 1935
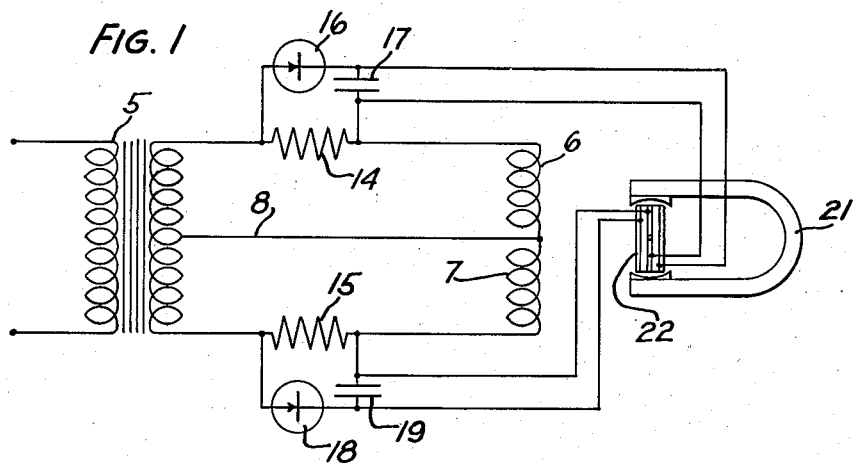
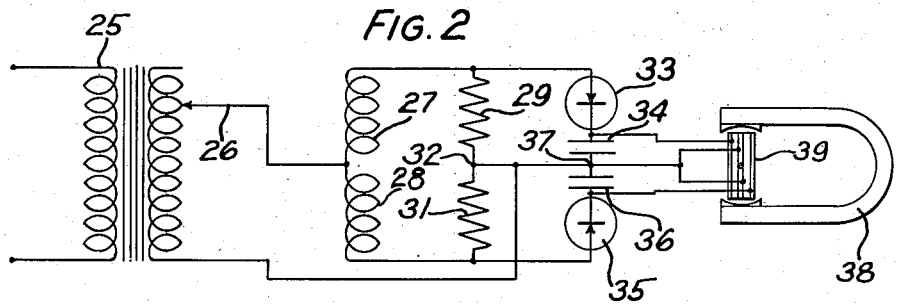
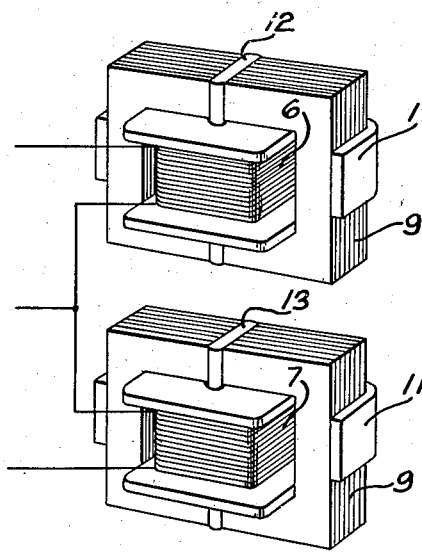
INVENTOR
K. L. SCOTT
BY H. A. Whitehorn
ATTORNEY Patented Feb. 14, 1939

2,146,857

UNITED STATES PATENT OFFICE 2,146,857

TESTING APPARATUS

Kenneth L. Scott, Western Springs, Ill., assignor to Western Electric Company, Incorporated, New York, N. Y., a corporation of New York Application September 19, 1935, Serial No. 41,187

10 Claims. (Cl. 175—183)

This invention relates to a method of and apparatus for testing magnetic materials and is a modification of the invention disclosed in my Patent No. 2,035,248, issued March 24, 1936.

The invention disclosed in the aforesaid patent makes a detailed analysis presented in visual form of various magnetic characteristics of material being tested. In many cases such a detailed analysis is not required and a more rapid determination of certain important characteristics is desirable.

Objects of the present invention are to provide an effective and efficient method of and apparatus for determining magnetic characteristics of magnetic material.

In accordance with one embodiment of the invention, a pair of like test coils is provided and the coils are energized to induce equal flux densities in a standard specimen and a test specimen. The magnetizing currents for the coils are passed through resistances and a rectifier and condenser are provided to respond to peak currents in the resistances, and the difference between the peak currents is indicated on a differential indicating device, thus indicating the permeability of the test specimen for the particular magnetization.

A complete understanding of the invention may be had by reference to the following description taken in conjunction with the accompanying drawing, in which Fig. 1 is a diagrammatic view of an apparatus embodying the invention;

Fig. 2 is a diagrammatic view of a modified form of the invention, and

Fig. 3 is a perspective view of testing coils and clamping means for holding the magnetic yokes in engagement with members to be tested.

Referring first to Fig. 1, a transformer 5 is provided, the secondary of which is connected to test coils 6 and 7. These coils are provided with an equal number of turns and preferably have the same dimensions and configuration. The junction point of the coils is connected by a conductor 8 to the mid-point of the secondary winding of transformer 5 so that equal voltages will be applied to the two test coils. The test coils are provided with magnetic yokes 9 held in place by clamps 11. Test coil 6 has a standard specimen 12 of magnetic material inserted therein and the coil 7 is adapted to receive a specimen 13 to be tested. Since the coils have equal voltages impressed thereon, the magnetic specimens under test will have equal flux densities induced therein. This will be evident when it is considered that if, for instance, the specimen 13 has a higher permeability than the specimen 12, at the flux under which they are being tested, the coil 7 will have a higher impedance and therefore less current will flow therein so that the flux density in the specimen 13 will be the same as the flux density in the specimen 12.

For many purposes it is not essential that a complete magnetic analysis be made of the magnetic material being tested. In most cases, it is sufficient to simply determine the permeability of a magnetic material for a given voltage applied to the test coils. However, in order to determine the permeability of magnetic material at a given voltage applied to the test coils, it is necessary that only the peak magnetizing currents be utilized in this determination. For this purpose a resistance 14 preferably of a low resistance value is connected in series with the test coil 6 and an identical resistance 15 is connected in series with the test coil 7. The voltages across these resistances will then obviously be proportional to the magnetizing currents in the coils 6 and 7.

The resistance 14 has a rectifier 16 and a serially connected condenser 17 connected across its terminals and similarly the resistance 15 has a rectifier 18 and serially connected condenser 19 connected across its terminals. When a magnetizing current flows through the resistance 14 the voltage across the resistance will be impressed upon the rectifier 16 to charge the condenser 17, and the condenser 17 will be charged to the peak of the voltage across the resistance. The condenser 19 will also be charged to the peak of the voltage across resistance 15. An indicating device is provided which may comprise a permanent magnet 21 having a movable element 22 which carries two high resistance coils. One of these coils is connected across condenser 17, and the other of the coils is connected across condenser 19. The resistances of these coils should be high so that the condensers will not discharge too freely therethrough and the coils are arranged in opposition so that when the condensers are equally charged the fluxes engendered in the coils will balance each other with no resulting deflection of the indicator.

Assuming now that the specimen 13 to be tested has a higher permeability than the standard specimen 12, the coil 7 will then have a higher impedance than the coil 6, and the peak of the magnetizing current flowing through resistance 15 will be lower than the peak of the magnetizing current flowing through resistance 14. The condenser 19 will therefore have a lower charge impressed thereon than the condenser 17 and the resulting deflection of the indicator will indicate the comparatively higher permeability of the specimen 13 under test.

Fig. 2 illustrates a modified form of the invention having a transformer 25 with a variable tap 26 in its secondary winding to vary the voltage applied to test coils 27 and 28. The test coils 27 and 28 have serially connected resistances 29 and 31 connected to two of their terminals and their common terminal is connected with the variable contact lead 26 of the secondary winding of transformer 25; the other lead from the secondary winding of the transformer is connected to the junction point 32 of resistances 29 and 31. It will be evident that by this arrangement equal voltages will be applied to the test coils 27 and 28.

Resistance 29 has a rectifier 33 and condenser 34 connected across its terminals, and the resistance 31 has a rectifier 35 and condenser 36 connected across its terminal. A conductor 37 interconnects the condensers to the junction point 32 of the resistances 29 and 31. The indicating device in this embodiment of the invention may be identical with that shown in connection with Fig. 1 and comprises a permanent magnet 38 and a movable element 39 having two oppositely wound coils thereon, one of which is connected across condenser 34 and the other of which is connected across condenser 36. It will be evident that the magnetizing currents flowing through resistances 29 and 31 will be proportional to the permeabilities of the magnetic materials inserted in the test coils and the comparative values of these permeabilities will be indicated by the indicating device. The permeability of the magnetic materials may be tested at any selected flux density or, in other words, at any voltage applied to the test coils by choosing the desired voltage derived from the secondary of the transformer.

While the invention has been described in connection with specific embodiments thereof, it will be evident that these are merely illustrative and that many changes and modifications may be made therein without departing from the spirit and scope of the invention.

What is claimed is:

1. In an apparatus for testing magnetic materials, a coil for receiving magnetic material to be tested, a second coil for receiving magnetic material of known characteristics, means for applying a variable current to said coils, and means responsive solely to the peaks of the magnetizing currents in said coils to determine a characteristic of the material under test.

2. In an apparatus for testing magnetic materials, a pair of test coils, means for applying equal voltages to said coils, and means responsive to the difference of the peaks of the magnetizing currents in said coils for indicating a difference in the magnetic properties of materials inserted in said coils.

3. In an apparatus for testing magnetic materials, a pair of test coils having an equal number of turns, means for applying equal voltages to said coils, means for selecting the peaks of the voltages of the magnetizing currents of said coils, and indicating means for indicating the difference between the selected peaks of voltages of the two coils.

4. A method of testing magnetic materials which comprises disposing magnetic material to be tested in like coils, inducing equal flux densities in the material in said coils by applying equal voltages to the coils, selecting the peaks of the magnetizing currents, and actuating an indicating device by the difference of said peaks of current.

5. A method of testing magnetic materials which comprises inducing equal flux densities in a standard specimen of magnetic material and a specimen to be tested, and actuating an indicating device by the differences of the peaks of the magnetizing currents.

6. In an apparatus for testing magnetic materials, a pair of test coils, means for applying equal voltages to said coils, a resistance in series with each of said coils, a rectifier and condenser connected serially across each of said resistances, and a differential indicating means in parallel with both of said condensers.

7. In an apparatus for testing magnetic materials, a pair of like test coils, means for applying equal voltages to said coils, a rectifier and condenser associated with each coil and responsive to peak magnetizing currents in said coils, and an indicating device responsive to the difference of the charges on said condensers.

8. In an apparatus for testing magnetic materials, a coil for receiving the magnetic material to be tested, a second coil for receiving a magnetic material of known characteristics, an indicating means, and means for rendering said indicating means responsive solely to peak magnetizing currents in said coils for determining a characteristic of the material being tested.

9. In an apparatus for testing magnetic materials, a pair of like coils, a pair of equal resistances, a source of alternating current one side of which is connected to the junction between said coils, and the other side of which is connected to the junction between said resistances, a rectifier and condenser serially connected across each of said resistances, and an indicating device having a pair of opposing coils one of which is connected across each of said condensers.

10. In an apparatus for testing magnetic materials, a pair of like coils, means for energizing said coils, a resistance associated with each coil to carry the magnetizing current of the coil, an indicating device having a pair of opposing coils, and means associated with said resistances for rendering the coils of said indicating device responsive to the peak magnetizing currents.

KENNETH L. SCOTT.